United States Patent
Huang et al.

(10) Patent No.: US 8,392,616 B2
(45) Date of Patent: Mar. 5, 2013

(54) METHOD AND APPARATUS FOR TRANSMITTING HEADER-COMPRESSED PACKET BASED ON RETRANSMISSION MECHANISM

(75) Inventors: Gang Huang, Shanghai (CN); Dai Shi, Shanghai (CN); Lei Lu, Shanghai (CN); Wenliang Liang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/436,280

(22) Filed: Mar. 30, 2012

(65) Prior Publication Data

US 2012/0189023 A1 Jul. 26, 2012

Related U.S. Application Data (63) Continuation of application No. PCT/CN2010/077911, filed on Oct. 20, 2010.

(30) Foreign Application Priority Data

Oct. 23, 2009 (CN) .......................... 2009 1 0236485

(51) Int. Cl.
*H04L 29/00* (2006.01)
(52) U.S. Cl. ........................................ 709/247; 370/477
(58) Field of Classification Search .................. 709/247, 709/246; 370/349, 254, 477; 455/502, 517
See application file for complete search history.

(56) References Cited

U.S. PATENT DOCUMENTS

| | | | |
|---|---|---|---|
| 6,542,931 B1 | 4/2003 | Le et al. | |
| 8,249,103 B2 * | 8/2012 | Yi et al. ........................ | 370/469 |
| 2006/0104266 A1 * | 5/2006 | Pelletier et al. ............... | 370/389 |
| 2007/0025345 A1 | 2/2007 | Bachl et al. | |
| 2007/0058679 A1 * | 3/2007 | Pelletier et al. ............... | 370/477 |
| 2007/0211724 A1 * | 9/2007 | Johansson et al. ............ | 370/392 |
| 2008/0151861 A1 * | 6/2008 | Zhang ........................... | 370/349 |

(Continued)

FOREIGN PATENT DOCUMENTS

| | | |
|---|---|---|
| CN | 1835588 A | 9/2006 |
| CN | 101365158 A | 2/2009 |

(Continued)

OTHER PUBLICATIONS

Bormann et al., "RObust Header Compression (ROHC): Framework and four profiles: RTP, UDP, ESP, and uncompressed,", Jul. 2001, IETF Network Working Group, RFC 3096, http://tools.ietf.org/html/rfc3095.*

(Continued)

*Primary Examiner* — Ruolei Zong
(74) *Attorney, Agent, or Firm* — Brinks Hofer Gilson & Lione (57) ABSTRACT

A method for transmitting a header-compressed packet based on a retransmission mechanism is disclosed according to the present disclosure. The method mainly includes: a header compressor of a sending device obtains feedback information of a header-compressed packet in a transmission process; and the header compressor determines a state of the header compressor according to the feedback information, compresses a header for the packet according to the state of the header compressor, and sends the packet to a decompressor of a receiving device. According to the present disclosure, a header compression mechanism is combined with an automatic retransmission mechanism, so that the header compressor obtains feedback information of an automatic retransmission technology, and estimates the decompression information of the decompressor correctly, so as to change a state machine of the header compressor at proper time and improve transmission efficiency of the packet.

17 Claims, 3 Drawing Sheets

U.S. PATENT DOCUMENTS

2008/0170552 A1* 7/2008 Zaks .................... 370/338
2008/0285566 A1  11/2008 Sammour et al.
2009/0238142 A1*  9/2009 Chun et al. ............. 370/331

FOREIGN PATENT DOCUMENTS

| CN | 101453298 A | 6/2009 |
|---|---|---|
| WO | WO 2007120335 A2 | 10/2007 |
| WO | WO 2009021443 A1 | 2/2009 |
| WO | WO 2009074101 A1 | 6/2009 |

OTHER PUBLICATIONS

International Search Report and Written Opinion of the International Searching Authority issued in corresponding PCT Patent Application No. PCT/CN2010/077911, mailed Jan. 27, 2011.

Suryavanshi et al., "A Hybrid ARQ Scheme for Resilient Packet Header Compression" The University of Texas at Dallas, Jul. 2005.

Lte, "3$^{rd}$ Generation Partnership Project; Technical Specification Group Radio Access Network; Evolved Universal Terrestrial Radio Access (E-UTRA) Medium Access Control (MAC) Protocol Specification" (Release 8) 3GPP TS 36.321, V8.7.0. Sep. 2009.

Bormann, Ed., "Robust Header Compression (ROHC): Framework and Four Profiles: RTP, UDP, ESP, and Uncompressed" Network Working Group, Jul. 2001.

Srinivasan et al., "IEEE 802.16m System Description Document (SDD)" IEEE 802.16m-09/0034r2, Sep. 24, 2009.

Supplementary European Search Report issued in corresponding European Patent Application No. 10 82 4462; dated Jul. 5, 2012.

3$^{rd}$ Generation Partnership Project; Technical Specification Group Radio Access Network; Radio Access Bearer Support Enhancements (Release5). 3GPP TR 25.860. Jun. 2002.

Office Action issued in corresponding Chinese Patent Application No. 200910236485.3, mailed Jul. 3, 2012.

* cited by examiner

METHOD AND APPARATUS FOR TRANSMITTING HEADER-COMPRESSED PACKET BASED ON RETRANSMISSION MECHANISM

CROSS-REFERENCE TO RELATED APPLICATIONS

This application is a continuation of International Application No. PCT/CN2010/077911, filed on Oct. 20, 2010, which claims priority to Chinese Patent Application No. 200910236485.3, filed on Oct. 23, 2009, both of which are hereby incorporated by reference in their entireties.

FIELD

The present disclosure relates to the field of communications technologies, and in particular, to a method and an apparatus for transmitting a header-compressed packet based on a retransmission mechanism.

BACKGROUND

As restricted by physical conditions, wireless links bring a low transmission rate and a high bit error rate when compared with wired links. When the IP protocol technology is applied to a wireless network cell environment, the packet header overhead is too large. For example, for an IPv6 voice communication packet, the packet payload actually required by a user is generally only 22% of the whole packet, thereby leading to a waste of bandwidth, and increasing the probability of discarding the packet due to errors of the packet. If no effective measure is taken, the quality of service of the user will be reduced while the precious wireless network resources are wasted.

A header compression mechanism may be adopted to solve such a problem, and may ensure the inherent flexibility of an IP protocol. The header compression mechanism may include: ROHC (Robust Header Compression), CRTP (Real-time Transport Protocol Header Compression) mechanism, ECRTP (Extended RTP Header Compression) mechanism and the like.

Taking the ROHC as an example, the ROHC is a stream-based header compression scheme. In the data transmission process of a network, most header fields in packets of the same stream have the same field value. The ROHC mechanism uses a packet in a certain stream as a reference packet. For other packets, only the changed information relative to the reference packet in the header field is sent, so as to accomplish the purpose of compression, save packet header overhead, and utilize bandwidth more efficiently.

To perform communication in a wireless network through an ROHC mechanism, an ROHC channel needs to be set up. The ROHC channel is a logical channel. In the logical channel, the ingress is a compressor, and the egress is a decompressor. The compressor is in a one-to-one correspondence with the decompressor. The compressor performs header compression for the original data, and then sends the data to the decompressor through the logical channel. The ROHC channel is a unidirectional logical channel. Meanwhile, to support bidirectional compression, the decompressor needs to provide feedback information for the compressor. Therefore, the ROHC feedback channel is a logical channel that bears the feedback information, the ingress is a decompressor, and the egress is a compressor.

The ROHC header compression mechanism may be briefly described as interaction between two state machines (a compression state machine, and a decompression state machine). Each of the two state machines has three different states. The two state machines start from the lowest compression state, and change to higher compression states gradually. The state transition mode of the compressor is shown in FIG. 1, and the state transition mode of the decompressor is shown in FIG. 2.

Figure 1:
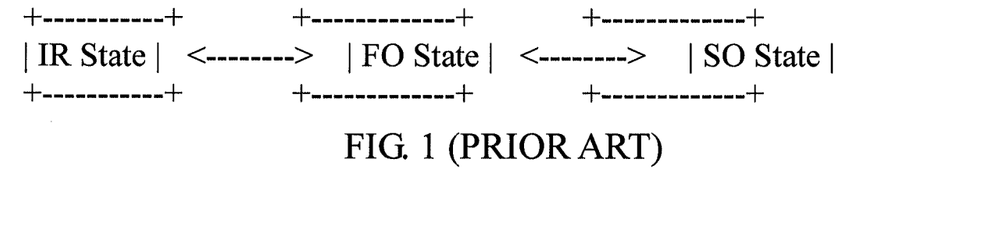
FIG. 1 is a schematic diagram of a state transition mode of a compressor in an ROHC header compression mechanism.

As shown in FIG. 1, the ROHC compressor includes three states: IR (Initial and Refresh), FO (First Order), and SO (Second Order). The initial state is an IR state. In this case, the decompressor almost has no static or dynamic information required for decompression. The ROHC compressor sends an IR or IR-DYM packet, which includes the static information (source IP address, destination IP address) in the data packet header and some dynamic information (SN sequence number, Timestamp and the like). An IR packet includes both the static information and the dynamic information, but an IR-DYM packet may include only the dynamic information. When the decompressor obtains the static information and a part of dynamic information, the compressor is in the FO state. When the decompressor obtains all static information and dynamic information, the compressor gets into the SO state, and the data of the packet header is compressed to the minimum.

Figure 2:
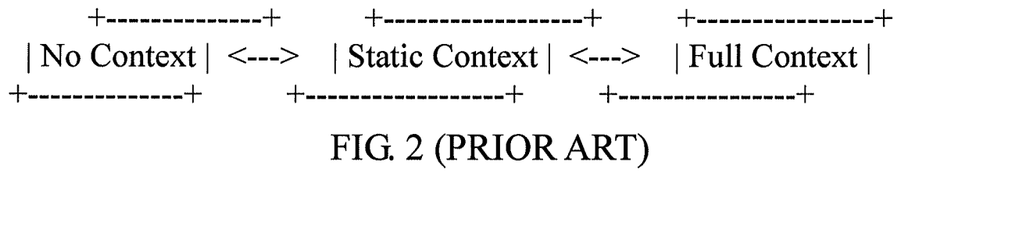
FIG. 2 is a schematic diagram of a state transition mode of a decompressor in an ROHC header compression mechanism.

As shown in FIG. 2, an ROHC decompressor includes three states: NC (No Context), SC (Static Context), and FC (Full Context). The NC is an initial state of the decompressor. In this case, the decompressor receives no packet, and has no information required for decompression. SC means that the decompressor has obtained all statistic decompression information and a part of dynamic decompression information; and FC means that the decompressor has obtained all static and dynamic decompression information.

The Context (context) information of the ROHC is divided into two different types: static Context information and dynamic Context information. The static Context information scarcely changes, and does not need to be transmitted by the compressor any more once the information is received by the receiver correctly. The dynamic context information is variable. The dynamic Context information in the existing IP packet header is mainly an SN, a timestamp, and an IP-id.

If a packet that includes the static Context information update is erroneous or lost, all subsequent packets will fail to obtain the static Context information, and plenty of subsequent header decompression will fail; if a certain number of packets are lost continuously, the dynamic Context information cannot be parsed from subsequent packets, and the failure of header decompression will be caused.

ARQ (auto repeat request) is a technology of recovering erroneous packets, in which the receiver requests the sender to retransmit the erroneous packets. ARQ is one of the methods of handling errors brought by the channels.

The ARQ includes three modes: stop-and-wait (stop-and-wait), go back for n frames (go-back-n) ARQ, selective repeat (selective repeat) ARQ, and hybrid ARQ (HARQ). The difference between them lies in different mechanism of processing erroneous packets.

The HARQ system introduces FEC (Forward Error Correction) into an ARQ system. The FEC may be used to correct data errors in the transmission process. That is, if an error is within the error correction scope of the FEC, the FEC corrects the error; if an error is beyond the error correction scope of the FEC, the receiver instructs the sender to retransmit part or all of the information of the erroneous packet, and then the receiver combines the packet information received again with the previously received packet information to recover the packet information.

The ROHC mechanism can be used to save the wireless network resource and improve the quality of service. However, because the existing ROHC mechanism handles the erroneous packet by discarding the packets directly without further processing, when the packet error rate reaches a certain level, the state retreats, the context information is updated, and the decompression state is synchronized again. When the wireless link state is inferior, the state retreats frequently, resulting in drastic decrease of the compression rate. However, the automatic retransmission mechanism can improve correction and reliability of sending packets.

In some wireless transmission systems in the prior art such as IEEE (Institute of Electrical and Electronics Engineers) 16m and LTE (Long Term Evolution) system, although the ROHC mechanism and the automatic retransmission mechanism are applied simultaneously, the ROHC mechanism and the automatic retransmission mechanism are applied as two relatively independent technologies, and the feature of correlation between the ROHC mechanism and the automatic retransmission mechanism is not used to enhance the system performance.

SUMMARY

Embodiments of the present disclosure provide a method and an apparatus for transmitting a header-compressed packet based on a retransmission mechanism, so that a header compressor uses feedback information of the retransmission mechanism to determine the state of the header compressor and performs header compression for packets according to the state of the header compressor.

A method for transmitting a header-compressed packet based on a retransmission mechanism includes: obtaining, by a header compressor of a sending device, feedback information of a header-compressed packet in a transmission process; and determining, by the header compressor, a state of the header compressor according to the feedback information, compressing a header for the packet according to the state of the header compressor, and sending the packet to a decompressor of a receiving device.

An apparatus for transmitting a header-compressed packet based on a retransmission mechanism includes: a feedback information obtaining module, configured to obtain feedback information of a header-compressed packet in a transmission process; and a header compression state processing module, configured to determine a state of a header compressor according to the feedback information, compress a header for the packet according to the state of the header compressor, and send the packet to a decompressor of a receiving device.

It can be seen from the solutions of the present disclosure that: By combining a header compression mechanism with a retransmission mechanism according to the embodiments of the present disclosure, a header compressor obtains feedback information of the retransmission mechanism, uses the feedback information to determine a state of the header compressor, performs corresponding state transition when necessary, and performs header compression for a packet according to the state of the header compressor, so as to improve the transmission efficiency of the packet.

BRIEF DESCRIPTION OF THE DRAWINGS

To describe the solutions of the present disclosure more clearly, the following outlines the accompanying drawings involved in the description of the embodiments of the present disclosure. Apparently, the accompanying drawings outlined below are merely about some embodiments of the present disclosure, and persons of ordinary skill in the art can derive other drawings from the accompanying drawings without making any creative effort.

DETAILED DESCRIPTION OF THE EMBODIMENTS

In embodiments of the present disclosure, a header compressor of a sending device obtains feedback information of a header-compressed packet in a transmission process; the header compressor determines a state of the header compressor according to the feedback information, performs header compression for the packet according to the state of the header compressor, and sends the packet to a decompressor of a receiving device.

For the ease of understanding the embodiments of the present disclosure, several exemplary embodiments which are taken as an example are further described in the following with reference to accompanying drawings. The embodiments given herein shall not be construed as limitation on the embodiments of the present disclosure.

Embodiment 1

The embodiment uses feedback information in an HARQ mechanism, an HARQ sender obtains transmission state information of a packet on an HARQ receiver, the HARQ sender feeds back the transmission state information to an ROHC header compressor, and the ROHC header compressor can predict a header decompression state of an ROHC decompressor according to the transmission state information, determine a state of the ROHC header compressor, and correspondingly change a state machine of the ROHC header compressor when necessary.

Figure 3:
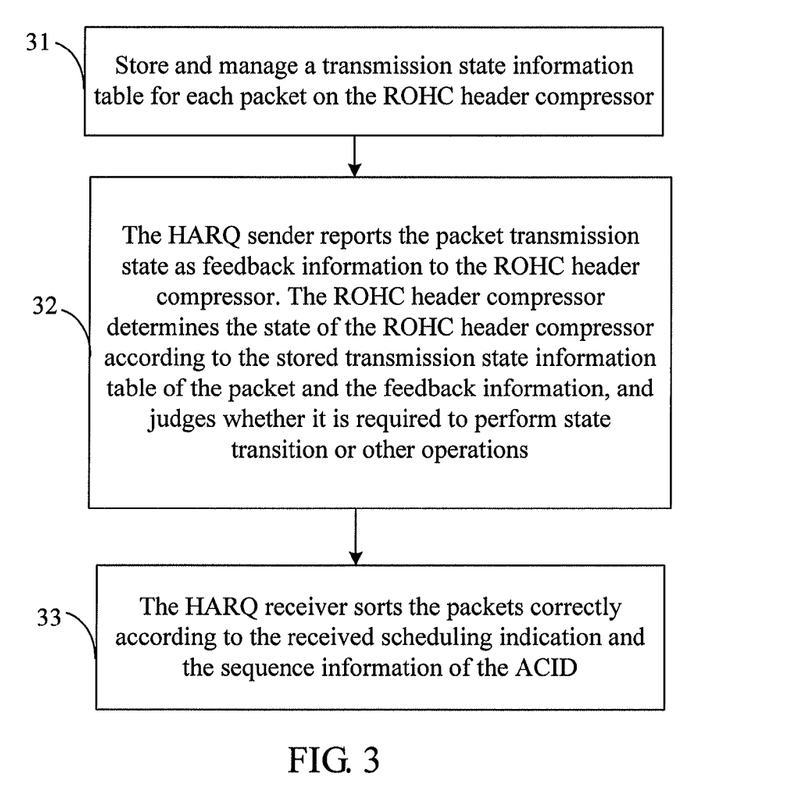
FIG. 3 is a flowchart of a method for performing ROHC compression for a packet based on HARQ according to a first embodiment of the present disclosure.

FIG. 3 shows a process of a method for transmitting a header-compressed packet based on HARQ in this embodiment. The method includes the following steps:

Step 31: Store and manage a transmission state information table for each packet on an ROHC header compressor.

In this embodiment, to enable the ROHC header compressor learn an actual transmission state of a packet in a network, the ROHC header compressor needs to store a transmission state information table for each packet on which header compression is performed. Transmission state information stored in the transmission state information table includes at least one piece of the following: a header compression sequence number, packet header information, packet transmission success or failure information, packet encapsulation information, HARQ process information and the like. The packet header information may include header compression Context information of ROHC, including static Context information and/or dynamic Context information.

The embodiment is described in the following by taking an IEEE 16m system as an example.

Figure 4:
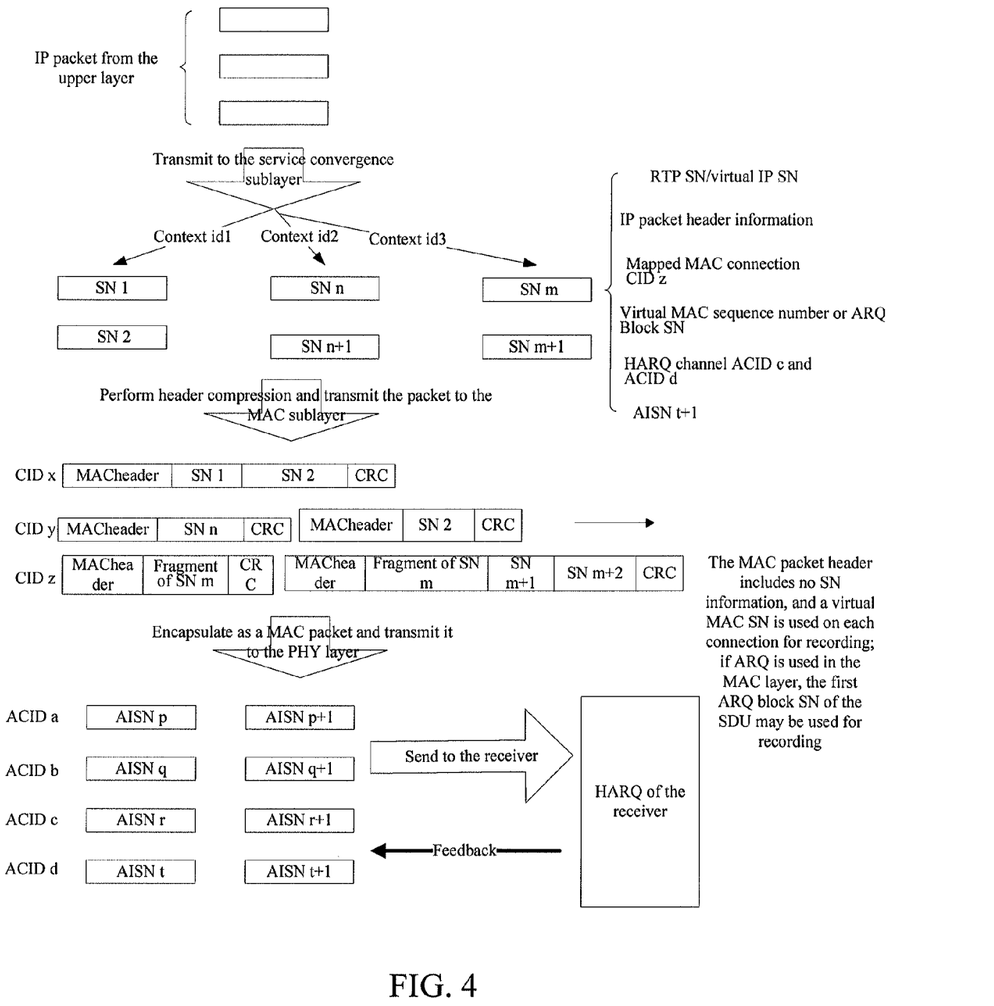
FIG. 4 is a schematic diagram of a process of transmitting a packet from an upper layer to an air interface in an IEEE 16m system according to a first embodiment of the present disclosure.

In an IEEE 16m system, a process of transmitting a packet from an upper layer to an air interface is shown in FIG. 4. A CS (Convergence Sublayer, convergence sublayer) receives packets from an upper-layer network, allocates the packets to different ROHC Contexts according to features of the packets, and performs header compression for the packets. If a packet includes an RTP (Transport Protocol Header Compression, Transport Protocol Header Compression) packet header, the RTP packet header may include SN information, and the SN information is used as a sequence number of header compression of the packet. If the packet includes no RTP packet header, a system may generate a virtual SN for the packet as an SN of header compression of the packet, where the SN starts from 0 and increases from 0.

After header compression is performed for the packets, the packets are mapped to different MAC (Medium Access Control) connections. According to an actual system resource state, a packet is encapsulated or fragmented into different MAC packets. In the case of fragmentation, a header-compressed packet may be fragmented into multiple different MAC packets for transmission. Each MAC packet includes a part of information of the header-compressed packet. For example, some packets include only packet header information, and some packets include only packet load information. A MAC packet includes no SN information. However, on each MAC connection, a system may generate a virtual MAC sequence as an identifier of the MAC packet. If a MAC layer supports ARQ, the system may use the SN of a first ARQ block in the MAC packet as the identifier of the MAC packet. An ARQ block is also a virtual block. All MAC packets on the MAC connection are divided into blocks by the ARQ block according to a fixed size, the blocks are sorted by the ARQ block, and an ARQ sequence number is generated for each block. After MAC packets are encapsulated into a proper size on the MAC layer, the MAC packets are mapped to different HARQ processes for transmission. On a current frame, MAC packets transmitted on the same HARQ process form an HARQ packet. A 1-bit AISN indicates whether the HARQ packet is a retransmitted packet.

In the IEEE 16m system, the packet encapsulation information includes: CID information of MAC, ARQ block information, virtual MAC SN information, information indicating whether a packet is encapsulated or fragmented, and the like. The HARQ process information includes: HARQ process information, HARQ packet retransmission identifier and the like.

Step 32: An HARQ sender reports a transmission state of a packet as feedback information to an ROHC header compressor. The ROHC header compressor determines a state of the ROHC header compressor according to a stored transmission state information table of the packet and the feedback information, and determines whether it is required to perform state transition or other operations.

In this embodiment, any processing performed by a lower layer for a packet needs to be reported to the ROHC header compressor. For example, after a data encapsulation entity encapsulates a header-compressed packet according to a network resource state, encapsulation information of the packet needs to be reported to the ROHC header compressor.

After the encapsulated packet is transmitted to an HARQ receiver through an HARQ process, the HARQ receiver needs to feed back a transmission state of the packet to an HARQ sender. The HARQ sender reports the received transmission state of the packet as feedback information to the ROHC header compressor. The ROHC header compressor finds a corresponding packet according to a locally stored transmission state information table of the packet. Then, according to the transmission state information table of the packet and the received transmission state of the packet, the ROHC header compressor determines whether it is required to perform state transition or other operations, for example, updating header compression information in a MAC packet in a cache. If the packet is received correctly, the compression state is updated according to the prior art of ROHC, and an IR state is shifted to an FO or SO state, or an FO state is shifted to an SO state. If the packet is transmitted incorrectly, the detailed state transition mode is described below.

Two scenarios in which the HARQ receiver feeds back the transmission state of the packet to the HARQ sender are described in the following.

Scenario 1: Relevant ROHC packets of a context ID are all transmitted on a corresponding MAC connection, and transmitted in a corresponding physical-layer HARQ process.

In this case, if an HARQ packet is received correctly, the HARQ receiver feeds back an ACK (ACKnowledge) to the HARQ sender; if an HARQ packet is received incorrectly, the HARQ receiver feeds back a NACK (Unacknowledged) to the HARQ sender; if a packet is lost in a transmission process, the HARQ receiver does not receive the packet, and does not send feedback information or feeds back that the packet is lost in the transmission, and therefore, the HARQ sender receives no acknowledgement information. If the HARQ receiver receives an HARQ packet whose AISN is the same as the AISN of a previous packet, it can learn that the HARQ packet is a retransmitted packet. For a retransmitted packet, the HARQ receiver also needs to feed back the ACK, NACK, or unacknowledged information to the HARQ sender. Because one HARQ packet may include multiple different header-compressed packets, the ACK, NACK, or unacknowledged information fed back by the HARQ receiver indicates whether the HARQ packet is received correctly. The ROHC header compressor obtains header-compressed packets transmitted correctly and/or unsuccessfully, according to the ACK, NACK, or unacknowledged information, and header-compressed packet information encapsulated in the HARQ packet in the transmission state table; and then obtains the order of the header-compressed packets received by the HARQ receiver correctly and the number of packets decompressed unsuccessfully by the decompressor, according to the header-compressed packets transmitted correctly and/or unsuccessfully.

According to the order of the header-compressed packets transmitted unsuccessfully and/or the order of the header-compressed packets received by the decompressor correctly, and the stored transmission state information of the header-compressed packets, the header compressor determines whether the decompressor can decompress a subsequent header-compressed packet; if the decompressor can decompress the subsequent header-compressed packet, the header compressor keeps an existing compression state unchanged or shifts from an incomplete compression state to a complete compression state; otherwise, the header compressor shifts from a complete compression state to an incomplete compression state. In an ROHC mechanism, the incomplete compression state includes an initial state or a first order state, and the complete compression state includes a second order state.

In a practical application, the HARQ sender does not necessarily need to transmit the ACK, or NAK, or unacknowledged information to the ROHC compressor. The HARQ sender may determine, according to the ACK, or NACK, or unacknowledged information, the packets transmitted correctly and/or unsuccessfully, and then obtain, according to the packets transmitted correctly and/or unsuccessfully, the order of the packets received by the HARQ receiver correctly and the number of packets decompressed unsuccessfully by the decompressor. The HARQ sender reports, to the ROHC compressor, the obtained packets transmitted correctly or unsuccessfully, and/or the order of packets received by the HARQ receiver correctly, and the number of packets decompressed unsuccessfully by the decompressor.

Because HARQ is a stop-and-wait protocol, before a packet is transmitted correctly or discarded, a next packet is not transmitted, and disorder never occurs unless a subsequent packet is discarded after the maximum number of times of transmission is reached. When the HARQ packet is discarded after the number of times of transmitting the packet exceeds the maximum number, the HARQ sender feeds back packet transmission failure to the ROHC header compressor.

After obtaining the packet transmission failure, the ROHC header compressor searches a transmission state information table corresponding to the packet and the certain number of subsequent packets according to the packets transmitted unsuccessfully. If the ratio of the number of packets decompressed unsuccessfully by the decompressor to the total number of header-compressed packets received by the decompressor reaches a preset threshold, namely, fulfills a "k of n" state transition requirement, it is determined whether the subsequent packets include an IR packet or IR-Dyn packet; if the subsequent packets include the IR packet or IR-Dyn packet, it is determined that the ROHC decompressor can recover the subsequent packets, and the ROHC header compressor performs no operation; otherwise, it is determined that the ROHC decompressor cannot recover the subsequent packets, and the state of the ROHC header compressor is shifted to an IR or FO state, and an IR or IR-Dyn packet is sent to update the header compression information of the ROHC decompressor.

If the ROHC header compressor determines that a subsequent MAC packet that is still in a MAC buffer and has not been sent cannot be decompressed correctly by the decompressor due to packet loss even if the MAC packet is sent to the decompressor, two processing modes exist. One processing mode is: The ROHC header compressor instructs the MAC and the HARQ sender to directly discard the packet that is in the buffer and has not been sent, so as to save air interface resources. Another processing mode is: The ROHC header compressor notifies a MAC sublayer through an inter-layer transmission mode; for a header-compressed packet that is in the MAC buffer, has not been sent, and has undergone the MAC encapsulation, information and a rule that are necessary and may be helpful for header decompression may be added into the packet in the form of a MAC sub-header (the information includes: header compression context information such as SN and/or TS and/or IP-ID, and the rule include: how to add relevant information to a corresponding MAC header); the information and rule are sent from an ROHC to a MAC through a primitive between protocol layers; upon receiving the primitive, a MAC layer processes, according to the received information and rule, the MAC packet that is in the MAC buffer and has not been sent.

If one header-compressed packet after an ROHC is split into multiple different MAC/RLC packets, the packet header and the payload (payload) of an ROHC packet may be distributed into different MAC/RLC packets for transmission; if the ROHC header compressor cannot learn in which MAC/RLC packet the header is located and in which MAC/RLC RLC packet the payload is located, and if one of the MAC/RLC packets is transmitted unsuccessfully, other MAC/RLC packets may be discarded directly. If the ROHC header compressor can learn in which MAC/RLC packet the header is located and in which MAC/RLC packet the payload is located, and if the MAC/RLC packet where the header is located is transmitted unsuccessfully, the ROHC header compressor requests a lower layer to discard other MAC/RLC packets among the MAC/RLC packets; if only the MAC packet where the payload is located is transmitted unsuccessfully, the MAC/RLC packet where the header is located continues to be transmitted, and the receiver is instructed to transmit header information to the ROHC decompressor. After receiving the MAC/RLC packet where the header is located, the decompressor uses the packet header information in the packet to perform header decompression and update header decompression context information, and then discards the MAC/RLC packet where the header is located.

For a case that a MAC connection corresponds to multiple header compression contexts, a processing mode is similar to that described above. The ROHC header compressor determines, according to received packet loss information and a locally stored transmission state information table of a packet, whether each affected context requires state transition or whether it is required to update header compression information in a MAC packet in a buffer.

Scenario 2: If relevant ROHC packets of a context ID are carried in different HARQ processes, packets transmitted in different HARQ processes may have different data error probabilities. For example, an HARQ process 1 bears packets whose sequence numbers are 1-3, and an HARQ process 2 bears packets whose sequence numbers are 4-6, and the HARQ process 1 and the HARQ process 2 start transmission simultaneously. However, in a transmission process, the packets with sequence numbers 4-6 are received by a receiver correctly after they are retransmitted for one time, but the packets with sequence numbers 1-3 are received by the receiver correctly after they are retransmitted for three times, and therefore, the packets with sequence numbers 4-6 are transmitted to the ROHC decompressor before the packets with sequence numbers 1-3. If such disorder of arrival of packets exceeds the size of a decompression window, decompression errors of packets may occur.

In such case, after an HARQ sender receives a header-compressed ROHC packet, if the ROHC packet needs to be carried in different HARQ processes for sending, a first packet in each automatic retransmission process is an initial header-compressed packet that includes header compression context information. The HARQ sender exemplarily divides HARQ processes according to the location of an IR or IR-DYN packet, and puts the IR packet or IR-DYN packet or a specifically generated IR packet or IR-DYN packet into a first location of an HARQ packet in each HARQ process. In this way, even if an HARQ packet in an HARQ process is lost, the decompression of HARQ packets in other HARQ processes will not be affected.

In this scenario, the HARQ receiver also needs to feed back the ACK and NACK information to the HARQ sender. According to the received ACK/NACK, the HARQ sender determines and maintains the state and order of an SDU (Service Data Unit) of a packet received by a receiver, and sends the receiving state and order of SDUs of the packet to the ROHC header compressor. The ROHC header compressor determines transmission disorder of packets according to the receiving state and order of the SDUs of the packet and the normal sending order of packets. Then, according to the transmission disorder of packets and stored transmission state information of a packet, it is determined whether the decompressor can decompress packets with disorder. If the decompressor cannot decompress the packets with disorder, the state of the ROHC header compressor is shifted to an IR or FO state, and an IR or IR-Dyn packet is sent to update header compression information of the ROHC decompressor; otherwise, the ROHC header compressor does not perform state transition.

For example, packets with RTP SNs 1, 2, and 3 are transmitted in a process 1, packets with RTP SNs 4, 5, and 6 are transmitted in a process 2, and packets with RTP SNs 7, 8, and 9 are transmitted in a process 3. Because retransmission occurs in the process 2, the packets with RTP SNs 7, 8, and 9 in the process 3 arrive at the decompressor first, and disorder occurs. If a decompression window is less than 3, a header decompression context maintained in a current decompressor cannot decompress a packet whose RTP SN is greater than 3. In this case, the compressor learns, according to feedback in a retransmission technology, the order of packets arriving at the decompressor, and learns that the decompressor cannot correctly decompress the packets whose SN is 7, 8, and 9; the number of erroneous packets fulfills a "k of n" state transition requirement; and subsequent header-compressed packets being transmitted include no IR/IR-Dyn packet. Therefore, the header compressor performs state transition, and shifts its own state from an SO state to an FO or IR state.

Step 33: The HARQ receiver sorts packets correctly according to a received scheduling indication and sequence information of an ACID.

When the HARQ sender performs packet scheduling, the HARQ sender may put the packets in HARQ processes in order of the packets, where the HARQ processes have consecutively increased ACIDs.

According to the scheduling indication and the sequence information of the ACID, the HARQ receiver may learn the order of packets that come from different HARQ processes, so as to sort the packets correctly.

On a best-effort basis, the HARQ receiver needs to ensure packets that belong to the same header compression context are sent to the ROHC header compressor sequentially, so as to reduce decompression failures caused by disorder.

If the ROHC header compressor determines, according to feedback information of an HARQ, that a subsequent packet that is still in a buffer and has not been sent cannot be decompressed by the decompressor correctly due to packet loss even if the MAC packet is sent to the decompressor, two processing modes exist. One processing mode is: The ROHC header compressor instructs the MAC and the HARQ sender to directly discard the packet that is in the buffer and has not been sent, so as to save air interface resources. Another processing mode is: The ROHC header compressor notifies a MAC sublayer through an inter-layer transmission mode; for a header-compressed packet that is in the MAC buffer, has not been sent, and has undergone the MAC encapsulation, information and a rule that are necessary and may be helpful for header decompression may be added into the packet in the form of a MAC sub-header; and the MAC packet that is in the MAC buffer and has not been sent is processed according to the received information and rule.

After the process of the method for performing HARQ-based ROHC compression for a packet in the first embodiment is applied, optionally, a CRC (cyclic redundancy check code, cyclic redundancy check code) in a header-compressed packet may be omitted to reduce consumption of the air interface resources. Alternatively, bits occupied by original CRC check codes are replaced with some information helpful for header decompression, for example, header compression information such as SN, IP-ID, and TS is added, so as to improve the success rate of header decompression.

Such a mode of omitting the CRC check is optional. If this mode is applied to perform header compression, relevant capability negotiation needs to be performed when a header compression context is set up initially, so as to determine to perform header compression of the packet with the mode of omitting the CRC check.

The process of the method for transmitting a header-compressed packet based on HARQ in the first embodiment above is also applicable to an LTE system.

Transmission state information stored in a transmission state information table includes at least one piece of the following: a header compression sequence number, packet header information, packet transmission success or failure information, HARQ process information and the like; and the packet header information may include: context information of the ROHC, including static context information and dynamic context information.

Because an LTE system is different from a 16m system, transmission information of the LTE system varies. The main difference is: The HARQ process information includes: an RLC (Radio Link Control) sequence number, a logical process id, an HARQ process number and the like.

On an LTE receiver, a UM (Unacknowledged Mode) and an AM (Acknowledged Mode) of an RLC sort received packets according to sequence numbers in RLC packet headers. In this scenario, the system has a function of sorting the packets automatically, and does not need to use scheduling information or retransmission information to sort the packets. For the TM of the RLC, no sorting function is available, and the packets need to be sorted according to the scheduling information and the retransmission information in the same way as the sorting in an IEEE 16m system.

In a practical application, the HARQ in the first embodiment may be replaced with an ARQ. Specifically, the ARQ receiver feeds back a packet transmission state to the ROHC header compressor. According to a stored transmission state information table of a packet and a transmission state of the packet, the ROHC header compressor determines whether it is required to perform state transition or other operations. The ROHC header compressor stores the packet transmission state information in the same way as the HARQ-related operation in the first embodiment. The transmission state of the packet, namely, feedback information indicating whether data that is received by the ARQ sender and is sent from the ARQ receiver is received correctly, specifically includes acknowledgement information indicating that the packet is correctly received, acknowledgement information indicating the packet is incorrectly received, or unacknowledged information caused by packet loss. The specific process of determining state transition or other operations is the same as the HARQ-related operation.

Persons of ordinary skill in the art understand that all or part of the steps of the method provided in the embodiment above may be implemented by a computer program instructing relevant hardware. The program may be stored in computer readable storage media. When the program runs, the program executes the steps of the method specified in the embodiment above. The storage media may be a magnetic disk, CD-ROM, read-only memory (ROM), or random access memory (RAM), and so on.

Embodiment 2

Figure 5:
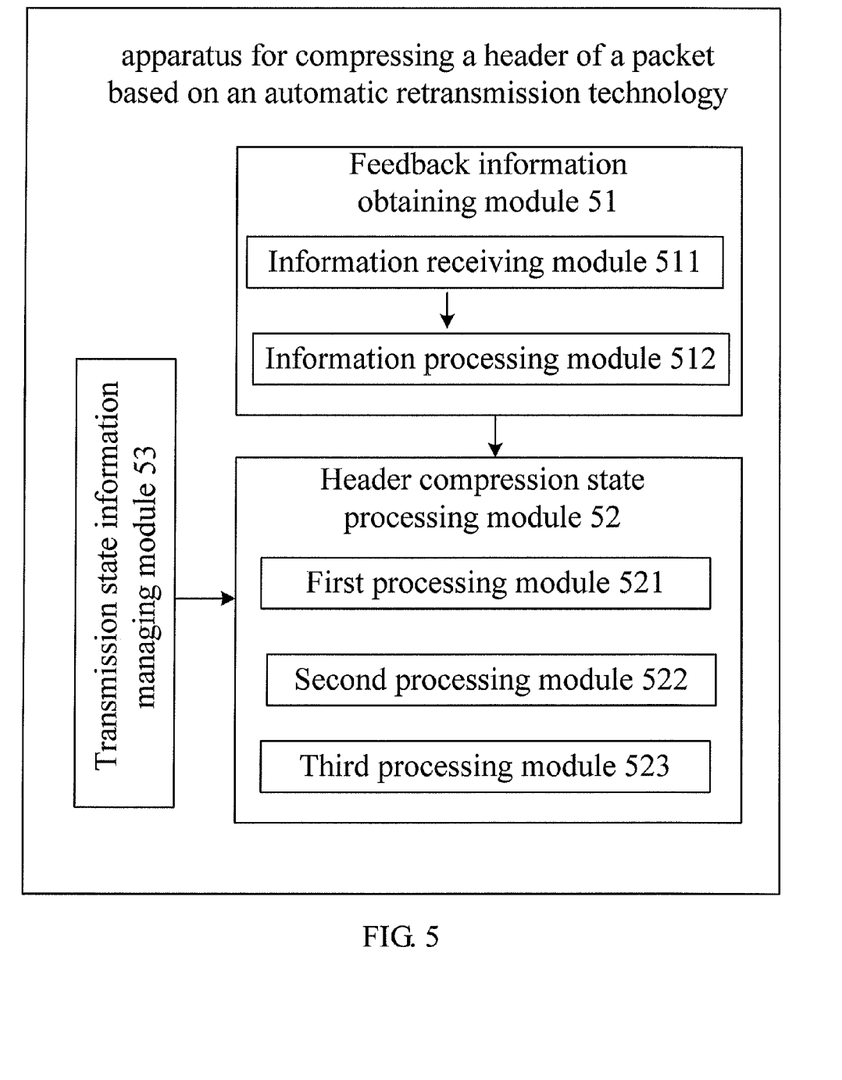
FIG. 5 is a structural schematic diagram of an apparatus for performing header compression for a packet based on an automatic retransmission technology according to a second embodiment of the present disclosure.

The embodiment of the present disclosure provides an apparatus for transmitting a header-compressed packet based on a retransmission technology. The apparatus is set on a header compressor of a sending device. A specific implementation structure is shown in FIG. 5, and the apparatus may specifically include:

a feedback information obtaining module 51, configured to obtain feedback information of a header-compressed packet in a transmission process; and a header compression state processing module 52, configured to determine a state of a header compressor according to the feedback information, perform header compression for the packet according to the state of the header compressor, and send the packet to a decompressor of a receiving device.

The apparatus may further include:

a transmission state information managing module 53, configured to store and manage transmission state information of the packet, where the transmission state information of the packet includes at least one piece of the following: a header compression sequence number, packet header information, transmission success or failure information, encapsulation information, retransmission process information and the like.

The feedback information obtaining module 51 includes:

an information receiving module 511, configured to: receive feedback information reported by a sender of a sending device based on a retransmission mechanism, where the feedback information is fed back by a receiver of a receiving device based on the retransmission mechanism to the sender of the sending device according to a transmission state of the packet;

an information processing module 512, configured to: obtain, according to the feedback information, header-compressed packets transmitted correctly and/or unsuccessfully, and determine the order of header-compressed packets received correctly by a decompressor, according to the header-compressed packets transmitted correctly and/or unsuccessfully. In a practical application, the header-compressed packets transmitted correctly and/or unsuccessfully, and/or the order of the header-compressed packets received by the decompressor correctly can be determined according to ACK, NACK, or unacknowledged information of the packet in the feedback information. Alternatively, the sender of the sending device based on the retransmission mechanism determines the header-compressed packets transmitted correctly and/or unsuccessfully, and/or the order of the header-compressed packets received by the decompressor correctly, according to the ACK, NACK, or unacknowledged information of the packet in the feedback information, and then reports to the information processing module.

The header compression state processing module 52 includes:

A first processing module 521, which is configured to: according to the order of the header-compressed packets received by the decompressor correctly and the transmission state information of the header-compressed packets, determine whether the decompressor can decompress a subsequent header-compressed packet, where the order is obtained by the information processing module and the transmission state information is stored in the header compressor. If the decompressor can decompress the subsequent header-compressed packet, the header compressor keeps an existing compression state unchanged or shifts a compression state from an incomplete compression state to a complete compression state; otherwise, the header compressor shifts the compression state from the complete compression state to the incomplete compression state.

In ROHC, the incomplete compression state includes an initial state or a first order state, and the complete compression state includes a second order state.

For example, the header compressor determines header-compressed packets transmitted unsuccessfully and the number of packets unsuccessfully decompressed by the decompressor, according to the ACK, NACK, or unacknowledged information of the header-compressed packet in the feedback information.

If the ratio of the number of packets decompressed by the decompressor unsuccessfully to the total number of header-compressed packets received by the decompressor reaches a preset threshold, it is determined whether header compression context information included in the subsequent packet is enough; if the header compression context information included in the subsequent packet is enough, it is determined that the decompressor can decompress the subsequent header-compressed packet; otherwise, it is determined that the decompressor cannot decompress the subsequent header-compressed packet.

For another example, the header compressor determines the order of header-compressed packets received by decompressor correctly, according to the ACK, NACK, or unacknowledged information of the header-compressed packet in the feedback information.

When multiple header-compressed packets on the same header compression context connection are carried in different retransmission processes for transmission, the header compressor determines disorder of transmission of header-compressed packets according to the order of the header-compressed packets received by the decompressor correctly and the normal order of sending the header-compressed packets.

The header compressor determines whether the decompressor can decompress the subsequent header-compressed packet, according to the disorder of transmission of the header-compressed packets and transmission state information that is of a packet and is stored in the header compressor.

After the header compressor shifts the compression state from the complete compression state to the incomplete compression state, the header compressor instructs the sender of the sending device that is based on the retransmission mechanism to discard a header-compressed packet in a retransmission buffer; or instructs the sender of the sending device that is based on the retransmission mechanism to add header compression context information into a header-compressed packet in a retransmission buffer and then to send the packet to the receiver of the receiving device that is based on the retransmission mechanism.

The second processing module 522, which is configured to serve the following purposes: If one header-compressed packet is split into multiple MAC or radio link control RLC packets, and the header compressor cannot determine in which MAC/RLC packet the header of the header-compressed packet is located and in which MAC/RLC packet the payload information of the header-compressed packet is located, the header compressor instructs the receiver of the receiving device that is based on the retransmission mechanism to discard the multiple MAC/RLC packets after the header compressor determines, according to the ACK, NACK, or unacknowledged information of the header-compressed packet in the feedback information, that at least one of the multiple MAC/RLC packets is lost;

If one header-compressed packet is split into multiple MAC/RLC packets, and the header compressor can learn in which MAC/RLC packet the header of the header-compressed packet is located and in which MAC/RLC packet the payload information of the header-compressed packet is located, the header compressor instructs the receiver of the receiving device that is based on the retransmission mechanism to discard the multiple MAC/RLC packets after the header compressor determines, according to the ACK, NACK, or unacknowledged information of the header-compressed packet in the feedback information, that the MAC/RLC packet where the payload of the header-compressed packet is located is lost; and If one header-compressed packet is split into multiple MAC/RLC packets and the header compressor can determine in which MAC/RLC packet the header of the header-compressed packet is located and in which MAC/RLC packet the payload information of the header-compressed packet is located, the receiver of the receiving device that is based on the retransmission mechanism continues transmitting, to the decompressor, the MAC/RLC packet where the compressed packet header is located, after the header compressor determines, according to the ACK, NACK, or unacknowledged information of the header-compressed packet in the feedback information, that the MAC/RLC packet where the payload of the header-compressed packet is located is lost; after receiving the MAC/RLC packet where the compressed packet header is located, the decompressor uses packet header information in the packet to perform header decompression and update header decompression context information, and then discards the MAC/RLC packet where the compressed packet header is located.

The third processing module 523 is configured to: omit a cyclic redundancy check code in a header-compressed packet in the process of performing header compression for the packet according to a state of the header compressor; or set information helpful for header decompression in bits occupied by a cyclic redundancy check code in the header-compressed packet.

In conclusion, the embodiments of the present disclosure combine a header compression mechanism with an automatic retransmission mechanism, so that an ROHC header compressor obtains feedback information of an automatic retransmission technology such as HARQ, and other useful information of a packet in wireless transmission; and stored transmission state information of the packet is used to correctly estimate header decompression information of an ROHC decompressor, so as to change a state machine of the ROHC header compressor or perform other data processing at proper time, thereby improving packet transmission efficiency and system performance.

In the embodiments of the present disclosure, a header compressor uses feedback information of an automatic retransmission technology, and therefore, feedback information of header compression sent by a decompressor to the header compressor is reduced, so as to save system resources.

The above description is merely exemplary embodiments of the present disclosure, but not intended to limit the protection scope of the present disclosure. Any variation or replacement that can be easily derived by those skilled in the art within the technical scope disclosed by the present disclosure shall fall within the protection scope of the present disclosure. Therefore, the protection scope of the present disclosure is subject to the appended claims.

What is claimed is:

1. A method for transmitting a header-compressed packet based on a retransmission mechanism, comprising:
    obtaining, by a header compressor of a sending device, feedback information of a header-compressed packet in a transmission process; and
    determining a state of the header compressor according to the feedback information, compressing a header for a packet according to the state of the header compressor, and sending the packet to a decompressor of a receiving device;
    wherein determining the state of the header compressor according to the feedback information comprises:
    obtaining, by the header compressor, header-compressed packets transmitted correctly and/or unsuccessfully, according to the feedback information; and determining order of header-compressed packets received correctly by the decompressor, according to the header-compressed packets transmitted correctly and/or unsuccessfully;
    determining, by the header compressor, whether the decompressor can decompress a subsequent header-compressed packet, according to the order of the header-compressed packets received by the decompressor correctly and transmission state information that is of the header-compressed packets and is stored by the header compressor; if the decompressor can decompress the subsequent header-compressed packet, keeping, by the header compressor, an existing compression state unchanged or shifting a compression state from an incomplete compression state to a complete compression state; otherwise, shifting a compression state from a complete compression state to an incomplete compression state; and
    after the shifting the compression state from the complete compression state to the incomplete compression state: instructing, by the header compressor, the sender of the sending device that is based on the retransmission mechanism to discard a header-compressed packet in a retransmission buffer; or, instructing the sender of the sending device that is based on the retransmission mechanism to add header compression context information into a header-compressed packet in a retransmission buffer and then send the packet to the receiver of the receiving device that is based on the retransmission mechanism.

2. The method according to claim 1, wherein obtaining, by the header compressor of the sending device, the feedback information of the header-compressed packet in a retransmission process, comprises:
    receiving, by the header compressor, the feedback information reported by a sender of the sending device that is based on a retransmission mechanism, wherein the feedback information is fed back by a receiver of the receiving device that is based on the retransmission mechanism to the sender of automatic retransmission according to a transmission state of the packet.

3. The method according to claim 1, wherein:
    in robust header compression ROHC, the incomplete compression state comprises an initial state or a first order state, and the complete compression state comprises a second order state.

4. The method according to claim 1, wherein:
    the determining whether the decompressor can decompress the subsequent header-compressed packet comprises:
    determining, by the header compressor, header-compressed packets transmitted unsuccessfully and the number of packets decompressed unsuccessfully by the decompressor according to AACK, NACK, and unacknowledged information of a header-compressed packet in the feedback information; and if a ratio of the number of packets decompressed by the decompressor unsuccessfully to the total number of header-compressed packets received by the decompressor reaches a preset threshold, determining whether header compression context information comprised in the subsequent packet is enough; if the header compression context information comprised in the subsequent packet is enough, determining that the decompressor can decompress the subsequent header-compressed packet; otherwise, determining that the decompressor can decompress the subsequent header-compressed packet.

5. The method according to claim 1, wherein determining whether the decompressor can decompress the subsequent header-compressed packet comprises:
determining, by the header compressor, the order of the header-compressed packets received correctly by the decompressor, according to ACK, NACK, or unacknowledged information of a header-compressed packet in the feedback information;
determining, by the header compressor, disorder of transmission of the header-compressed packets according to the order of the header-compressed packets received by the decompressor correctly and normal order of sending the header-compressed packets, when multiple header-compressed packets on a same header compression context connection are carried in different retransmission processes for transmission; and
determining, by the header compressor, whether the decompressor can decompress the subsequent header-compressed packet according to the disorder of transmission of the header-compressed packets and the transmission state information that is of the packets and is stored by the header compressor.

6. The method according to claim 1, wherein:
the transmission state information of the header-compressed packet comprises at least one piece of the following: a header compression sequence number, packet header information, transmission success or failure information, encapsulation information, and retransmission process information.

7. The method according to claim 1, further comprising at least one of the following:
if one header-compressed packet is split into multiple MAC or RLC packets and the header compressor cannot determine in which MAC or RLC packet a compressed packet header is located and in which MAC or RLC packet payload information of the header-compressed packet is located, instructing, by the header compressor, the receiver of the receiving device that is based on the retransmission mechanism to discard the multiple MAC or RLC packets after determining, by the header compressor according to ACK, NACK, or unacknowledged information of a header-compressed packet in the feedback information, that at least one of the multiple MAC or RLC packets is lost;
if one header-compressed packet is split into multiple MAC or RLC packets and the header compressor can determine in which MAC or RLC packet a compressed packet header is located and in which MAC or RLC packet payload information of the header-compressed packet is located, instructing, by the header compressor, the receiver of the receiving device that is based on the retransmission mechanism to discard the multiple MAC or RLC packets after determining, by the header compressor according to ACK, NACK, or unacknowledged information of a header-compressed packet in the feedback information, that the MAC or RLC packet where the compressed packet header is located; and
if one header-compressed packet is split into multiple MAC or RLC packets and the header compressor can determine in which MAC or RLC packet a compressed packet header is located and in which MAC or RLC packet payload information of the header-compressed packet is located, after determining, by the header compressor according to ACK, NACK, or unacknowledged information of a header-compressed packet in the feedback information, that the MAC or RLC packet where payload of the header-compressed packet is located is lost, continuing transmitting, by the receiver of the receiving device based on the retransmission mechanism, the MAC or RLC packet where the compressed packet header is located to the decompressor; by the decompressor, using packet header information in the packet to perform header decompression and update header decompression context information after receiving the MAC or RLC packet where the compressed packet header is located, and then discarding the MAC or RLC packet where the compressed packet header is located.

8. The method according to claim 1, further comprising:
when multiple header-compressed packets on a some header compression context connection are carried in different retransmission processes for transmission, if the multiple header-compressed packets comprise an initial header-compressed packet that comprises header compression information, a first header-compressed packet in each retransmission process is the initial header-compressed packet that carries the header compression information.

9. The method according to claim 1, further comprising:
if a header-compressed packet needs to be carried on multiple retransmission processes for transmission, putting sequentially, by the sender of the sending device based on the retransmission mechanism, the header-compressed packets in retransmission processes for transmission, wherein the retransmission processes have consecutively increasing identifiers; and
sorting, by the receiver of the receiving device based on the retransmission mechanism, received packets transmitted on the multiple retransmission processes, according to scheduling information of the received packets and sequence information of the identifiers of the multiple retransmission processes.

10. The method according to claim 1, wherein compressing the header of the packet according to the state of the header compressor comprise:
omitting a cyclic redundancy check code in the header-compressed packet; or
setting information helpful for header decompression in bits occupied by a cyclic redundancy check code in the header-compressed packet.

11. An apparatus for transmitting a header-compressed packet based on a retransmission mechanism, comprising:
a receiver, configured to obtain feedback information of a header-compressed packet in a transmission process;
a processor, configured to determine a state of a header compressor according to the feedback information, compress a header for a packet according to a state of the header compressor, and
a transmitter, configured to send the packet to a decompressor of a receiving device;

wherein the processor configured to determine the state of the header compressor according to the feedback information comprises the processor configured to:

obtain header-compressed packets transmitted correctly and/or unsuccessfully, according to the feedback information; and determine order of header-compressed packets received correctly by the decompressor, according to the header-compressed packets transmitted correctly and/or unsuccessfully; and determine whether the decompressor can decompress a subsequent header-compressed packet, according to the order of the header-compressed packets received by the decompressor correctly and transmission state information that is of the header-compressed packets and is stored by the header compressor; if the decompressor can decompress the subsequent header-compressed packet, keep an existing compression state unchanged or shift a compression state from an incomplete compression state to a complete compression state; otherwise, shift a compression state from a complete compression state to an incomplete compression state;

after the shift the compression state from the complete compression state to the incomplete compression state, the processor is configured to:

instruct the sender of the sending device that is based on the retransmission mechanism to discard a header-compressed packet in a retransmission buffer; or, instruct the sender of the sending device that is based on the retransmission mechanism to add header compression context information into a header-compressed packet in a retransmission buffer and then send the packet to the receiver of the receiving device that is based on the retransmission mechanism.

12. The apparatus according to claim 11, further comprising:

a memory, configured to store and manage transmission state information of the packet, wherein the transmission state information of the packet comprises at least one piece of the following: a header compression sequence number, packet header information, transmission success or failure information, encapsulation information, and retransmission process information.

13. The apparatus according to claim 11, wherein:

the receiver is further configured to receive feedback information reported by a sender of a sending device that is based on a retransmission mechanism, wherein the feedback information is fed back, according to transmission state of the packet, by a receiver of the receiving device that is based on the retransmission mechanism to the sender of the sending device.

14. The apparatus according to claim 11, wherein:

the processor is further configured to serve at least one of the following purposes: if one header-compressed packet is split into multiple MAC or RLC packets and the header compressor cannot determine in which MAC or RLC packet a compressed packet header is located and in which MAC or RLC packet payload information of the header-compressed packet is located, the header compressor instructs the receiver of the receiving device that is based on the retransmission mechanism to discard the multiple MAC or RLC packets after the header compressor determines, according to ACK, NACK, or unacknowledged information of a header-compressed packet in the feedback information, that at least one of the multiple MAC packets or RLC packets is lost;

if one header-compressed packet is split into multiple MAC or RLC packets and the header compressor can determine in which MAC or RLC packet a compressed packet header is located and in which MAC or RLC packet payload information of the header-compressed packet is located, the header compressor instructs the receiver of the receiving device that is based on the retransmission mechanism to discard the multiple MAC or RLC packets after the header compressor determines, according to ACK, NACK, or unacknowledged information of a header-compressed packet in the feedback information, that the MAC or RLC packet where the compressed packet header is located is lost;

if one header-compressed packet is split into multiple MAC packets or RLC packets and the header compressor can determine in which MAC or RLC packet a compressed packet header and in which MAC or RLC packet payload information of the header-compressed packet is located, after the header compressor determines, according to ACK, NACK, or unacknowledged information of a header-compressed packet in the feedback information, that the MAC or RLC packet where payload of the header-compress packet is located, the receiver of the receiving device based on the retransmission mechanism continues transmitting the MAC or RLC packet where the compressed packet header is located to the decompressor; the decompressor uses packet header information in the packet to perform header decompression and update header decompression context information after receiving the MAC or RLC packet where the compressed packet header is located, and then discards the MAC or RLC packet where the compressed packet header is located.

15. The apparatus according to claim 11, wherein:

the processor is further configured to omit a cyclic redundancy check code in the header-compressed packet; or set information helpful for header decompression in bits occupied by a cyclic redundancy check code in the header-compressed packet when compressing the header of the packet according to the state of the header compressor.

16. A method for transmitting a header-compressed packet based on a retransmission mechanism, comprising:

obtaining, by a header compressor of a sending device, feedback information of a header-compressed packet in a transmission process;

determining a state of the header compressor according to the feedback information, compressing a header for a packet according to the state of the header compressor, and sending the packet to a decompressor of a receiving device; and comprising at least one of the following:

if one header-compressed packet is split into multiple MAC or RLC packets and the header compressor cannot determine in which MAC or RLC packet a compressed packet header is located and in which MAC or RLC packet payload information of the header-compressed packet is located, instructing, by the header compressor, the receiver of the receiving device that is based on the retransmission mechanism to discard the multiple MAC or RLC packets after determining, by the header compressor according to ACK, NACK, or unacknowledged information of a header-compressed packet in the feedback information, that at least one of the multiple MAC or RLC packets is lost;

if one header-compressed packet is split into multiple MAC or RLC packets and the header compressor can determine in which MAC or RLC packet a compressed packet header is located and in which MAC or RLC packet payload information of the header-compressed packet is located, instructing, by the header compressor, the receiver of the receiving device that is based on the retransmission mechanism to discard the multiple MAC or RLC packets after determining, by the header compressor according to ACK, NACK, or unacknowledged information of a header-compressed packet in the feedback information, that the MAC or RLC packet where the compressed packet header is located; and if one header-compressed packet is split into multiple MAC or RLC packets and the header compressor can determine in which MAC or RLC packet a compressed packet header is located and in which MAC or RLC packet payload information of the header-compressed packet is located, after determining, by the header compressor according to ACK, NACK, or unacknowledged information of a header-compressed packet in the feedback information, that the MAC or RLC packet where payload of the header-compressed packet is located is lost, continuing transmitting, by the receiver of the receiving device based on the retransmission mechanism, the MAC or RLC packet where the compressed packet header is located to the decompressor; by the decompressor, using packet header information in the packet to perform header decompression and update header decompression context information after receiving the MAC or RLC packet where the compressed packet header is located, and then discarding the MAC or RLC packet where the compressed packet header is located.

17. An apparatus for transmitting a header-compressed packet based on a retransmission mechanism, comprising:
a receiver, configured to obtain feedback information of a header-compressed packet in a transmission process;
a processor, configured to determine a state of a header compressor according to the feedback information, compress a header for a packet according to a state of the header compressor, and
a transmitter, configured to send the packet to a decompressor of a receiving device;
the processor is configured to serve at least one of the following purposes: if one header-compressed packet is split into multiple MAC or RLC packets and the header compressor cannot determine in which MAC or RLC packet a compressed packet header is located and in which MAC or RLC packet payload information of the header-compressed packet is located, the header compressor instructs the receiver of the receiving device that is based on the retransmission mechanism to discard the multiple MAC or RLC packets after the header compressor determines, according to ACK, NACK, or unacknowledged information of a header-compressed packet in the feedback information, that at least one of the multiple MAC packets or RLC packets is lost;

if one header-compressed packet is split into multiple MAC or RLC packets and the header compressor can determine in which MAC or RLC packet a compressed packet header is located and in which MAC or RLC packet payload information of the header-compressed packet is located, the header compressor instructs the receiver of the receiving device that is based on the retransmission mechanism to discard the multiple MAC or RLC packets after the header compressor determines, according to ACK, NACK, or unacknowledged information of a header-compressed packet in the feedback information, that the MAC or RLC packet where the compressed packet header is located is lost;

if one header-compressed packet is split into multiple MAC packets or RLC packets and the header compressor can determine in which MAC or RLC packet a compressed packet header and in which MAC or RLC packet payload information of the header-compressed packet is located, after the header compressor determines, according to ACK, NACK, or unacknowledged information of a header-compressed packet in the feedback information, that the MAC or RLC packet where payload of the header-compress packet is located, the receiver of the receiving device based on the retransmission mechanism continues transmitting the MAC or RLC packet where the compressed packet header is located to the decompressor; the decompressor uses packet header information in the packet to perform header decompression and update header decompression context information after receiving the MAC or RLC packet where the compressed packet header is located, and then discards the MAC or RLC packet where the compressed packet header is located.

* * * * *